Patented Apr. 21, 1931

1,802,036

UNITED STATES PATENT OFFICE

EMIL SCHEITLIN, OF BASEL, SWITZERLAND

PROCESS OF MAKING AN ORGANIC MERCURY COMPOUND

No Drawing. Application filed November 19, 1928, Serial No. 320,536, and in Germany November 23, 1927.

My invention refers to a method of making an organic mercury compound being adapted for use as a remedy.

I have found that 1-phenyl-2,3-dimethyl-4-sulfamino-5-pyrazolon if combined with a mercuric salt forms complex compounds which contain 1 atom mercury to 4 molecules pyrazolon, these complex compounds being particularly adapted for therapeutic use as they possess a great spirillocide action and are readily soluble in physiological salt solution.

The processes hitherto known for preparing mercury compounds of the pyrazolon series resulted in compounds of an altogether different character. Thus by acting at an elevated temperature with mercury oxide on a watery solution of 1-phenyl-2,3-dimethyl-4-sulfamino-5-pyrazolon there was obtained a white crystalline body insoluble in water and other solvents.

If the water-soluble salts of 1-phenyl-2,3-dimethyl-4-sulfamino-5-pyrazolon were treated at an elevated temperature with bivalent mercury salts, there resulted a greenish powder containing 67–68 per cent mercury, for the major part in the form of a lower oxide.

According to the present invention mercury and sulfuric acid are caused to act at ordinary temperature on a watery solution of 1-phenyl-2,3-dimethyl-4-sulfamino-5-pyrazolon. There result white crystals containing 17,6 per cent mercury. The compound is believed to have the formula

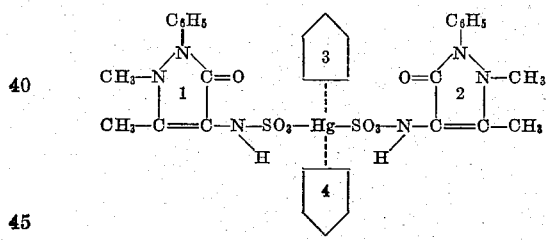

It is soluble in physiological sodium chloride solution and if an alkali is added no precipitation occurs. This shows that the compound resulting in the reaction is a pure complex mercuric compound free from mercuro compounds.

Example 7 grams 1-phenol-2,3-dimethyl-4-sulfamino-5-pyrazolon are dissolved in 100 ccms. water. 2.7 grams mercuric oxide are dissolved in 10 to 20 ccms. water to which have been added 2.5 ccms. sulfuric acid of 66° Bé. These two solutions are mixed at ordinary temperature or at least at a temperature not exceeding 50° C. After standing a while this mixture separates out crystals, which are separated from the mother liquor and dried. The compound is white colored, it contains 17,6–17,7 per cent mercury and is soluble in dilute caustic soda, in hydrochloric acid and in physiological salt solution. On heating the compound melts under decomposition, when heated to still higher temperatures it will char. In concentrated sulfuric acid the compound dissolves under decomposition. In alcohol, ether and the usual organic solvents is it insoluble.

Various changes may be made in the details disclosed in the foregoing specification without departing from the invention or sacrificing the advantages thereof.

I claim:—

The method of producing an organic compound of mercury comprising acting on 1-phenyl-2,3-dimethyl-4-sulfamino-5-pyrazolon at a temperature below 50° C. in the presence of sulfuric acid with mercuric oxide, the latter acting as sulfate in the process.

In testimony whereof I affix my signature.

EMIL SCHEITLIN.